United States Patent
Sassoon

(10) Patent No.: US 8,009,364 B2
(45) Date of Patent: Aug. 30, 2011

(54) LENS FOR LED LAMPS

(76) Inventor: Charles I. Sassoon, Kings Point, NY (US)

( * ) Notice: Subject to any disclaimer, the term of this patent is extended or adjusted under 35 U.S.C. 154(b) by 306 days.

(21) Appl. No.: 11/450,798

(22) Filed: Jun. 8, 2006

(65) Prior Publication Data

US 2007/0171641 A1    Jul. 26, 2007

Related U.S. Application Data

(60) Provisional application No. 60/760,821, filed on Jan. 20, 2006.

(51) Int. Cl.
G02B 3/00 (2006.01)
B60Q 1/26 (2006.01)

(52) U.S. Cl. .......... 359/642; 362/540
(58) Field of Classification Search .......... 362/540; 359/619, 642
See application file for complete search history.

(56) References Cited

U.S. PATENT DOCUMENTS

| | | | | |
|---|---|---|---|---|
| 2,147,914 A * | 2/1939 | Morehead | | 362/540 |
| 6,533,445 B1 * | 3/2003 | Rogers | | 362/540 |
| 6,623,150 B2 * | 9/2003 | Roller et al. | | 362/520 |
| 2002/0024822 A1 | 2/2002 | Pond et al. | | |
| 2002/0030998 A1 * | 3/2002 | Natsume | | 362/509 |
| 2002/0044454 A1 * | 4/2002 | Roller et al. | | 362/540 |
| 2006/0007692 A1 * | 1/2006 | Hsien | | 362/382 |

FOREIGN PATENT DOCUMENTS

GB    2 297 149 A    7/1996

OTHER PUBLICATIONS

European Search Report in Eurpean Patent Application No. EP 06018017, mailed Sep. 11, 2007.

* cited by examiner

*Primary Examiner* — Joseph Martinez
*Assistant Examiner* — James R Greece
(74) *Attorney, Agent, or Firm* — Stroock & Stroock & Lavan LLP

(57) ABSTRACT

The present invention relates to a lens for use with a lamp having at least one LED light source. The lens preferably includes a plurality of projections each having a substantially flat top surface and a plurality of sloping side surfaces, preferably suitable for dispersing the emitted light. Such a variance in light emission may enhance the light being viewed from different angles and positions therefrom.

12 Claims, 5 Drawing Sheets

LENS FOR LED LAMPS

CROSS-REFERENCE TO RELATED APPLICATIONS

This application claims the benefit of U.S. Provisional Application Ser. No. 60/760,821 filed on Jan. 20, 2006, entitled "LENS FOR LAMPS FOR A VEHICLE", which is hereby incorporated in its entirety by reference.

BACKGROUND OF THE INVENTION

1. Field of the Invention

The present invention relates to a lens for use with light-emitting diode (LED) light sources, for example, light fixtures and lamps such as free standing lamps, stop/tail/turn lamps for vehicles, etc. More particularly, the present invention relates to a lens having a structure suitable for maintaining or magnifying the intensity of light emitted from the LED as well as to facilitate dispersing the emitted light.

2. Description of Related Art

One of the problems associated with using a light-emitting diode (LED) light source, for example, in a lamp for a vehicle, is the difficulty in spreading the illumination in a longitudinal direction, i.e., an arc-like pattern. While LEDs are often preferred because they can have an operating life of up to 100,000 hours before degradation commences, the light emitted from LEDs is in a narrow cone-shaped pattern. More specifically, an LED is a directional light source in which light is emitted in a direction generally perpendicular from the light surface. The amount of longitudinal dispersion is minor compared to an incandescent bulb. A typical radiation pattern for an LED is within approximately 20° of the direction generally perpendicular from the light source. Therefore, LED lamps or light fixtures may be insufficient for adequately illuminating an area, such as a room, a hallway, an outdoor area, etc.

Vehicles, such as an automobile or truck/trailer combination typically have stop/tail/turn lamps on the front and/or the rear of the vehicle, to indicate that the vehicle is stopping, turning, changing lanes, etc. The stop/tail/turn lamps typically include a housing, which includes the light source, and a lens, which protects the light source from the natural elements. Typically, the light source is either a standard high-intensity incandescent bulb, which has a relatively short life span and is susceptible to damage, or an LED, which has a greater operating life. However, the narrowness of the emitted light can render LEDs less than completely satisfactory for use in stop/tail/turn lamps.

Thus, there exists a need to provide a lens suitable for use with an LED light source, such as a lamp, a light fixture, stop/tail/turn lamp, etc. which is relatively inexpensive and easy to manufacture and which in combination with the LED can provide sufficient illumination, for example for use on a vehicle.

SUMMARY OF THE INVENTION

The present invention relates to a lens for use with LED light sources, for example, light fixtures and lamps such as freestanding lamps, stop/tail/turn lamps for vehicles, etc. In one embodiment of the invention, the lens of the present invention includes a plurality of projections each having a substantially flat top surface, preferably suitable for magnifying the emitted light, and a plurality of sloping side surfaces, preferably suitable for dispersing the emitted light. In a preferred embodiment of the invention, each projection has multiple sloping side surfaces, which preferably vary the direction of light emission, for example, by refracting the light being transmitted through the sloping side surfaces of the lens. Therefore, the light being emitted by the LED can be transmitted in various directions, thus increasing the area that is illuminated by the LED in comparison to an LED without such a lens. In accordance with one embodiment of the invention, each projection is substantially aligned with an LED. Such a variance in light emission may enhance the light being viewed from different angles and positions from the light source. Namely, by transmitting the light at a variety of angles from the LED, the light can be seen at various angles from the light source, rather than being limited to positions substantially perpendicular to the light source.

BRIEF DESCRIPTION OF THE DRAWINGS

The particular features and advantages of the invention as well as other objects will become apparent from the following description taken in connection with the accompanying drawings, in which.

DESCRIPTION OF EXEMPLARY EMBODIMENTS

Figure 1A:
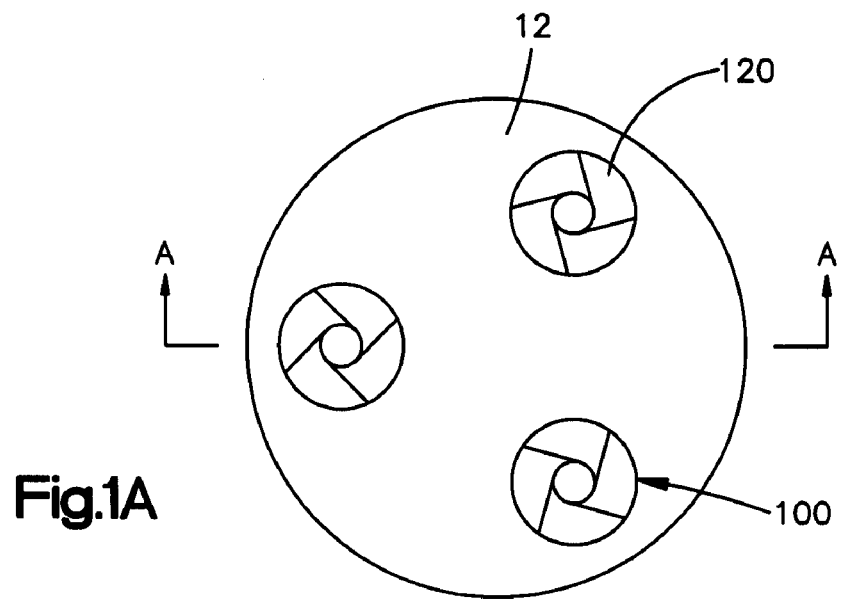
FIG. 1A is a top plan view a lamp assembly in accordance with one embodiment of the present invention.

Certain exemplary embodiments of the present invention will now be described with reference to the drawings. In general, such embodiments relate to a lens containing one or more projections for outwardly directing light emitting from an LED light source.

Referring to FIGS. 1A-7, in accordance with certain embodiments of the invention, a lens 10, which includes a base 12 and a plurality of projections 100, is particularly suited for use with an LED light source. Whereas base 12 can be substantially flat and round, as depicted in FIGS. 1A, 3, 5 and 7, it is to be understood that base 12 can comprise a variety of shapes, smoothness, flatness, include bumps, etc., without deviating from the scope of the invention, as a matter of application specific to design choice. For example, for use with a stop/tail/turn lamp of a vehicle, it is preferably for base 12 to take on the shape of the stop/tail/turn lamp, which is typically round or oval, having a diameter of between about 2-6 inches, preferably about 4 inches. In contrast, a lens for use with a light fixture can be any shape or size.

Referring to FIGS. 1-8, projections 100 preferably comprise a translucent material that can transmit, more preferably disperse, light emitting from an LED light source, such as but not limited to polycarbonate, acrylic, etc. Accordingly, it is preferred to position at least one LED light source substantially aligned with a projection 100. As shown in FIGS. 1A-10, an embodiment of projection 100 has a substantially flat top surface 110 substantially parallel to the base. Accordingly, light emitted from the LED can be transmitted in a direction substantially perpendicular to the base through top surface 110. More preferably, top surface 110 can magnify the intensity of the light emitted from the LED.

Figure 8:
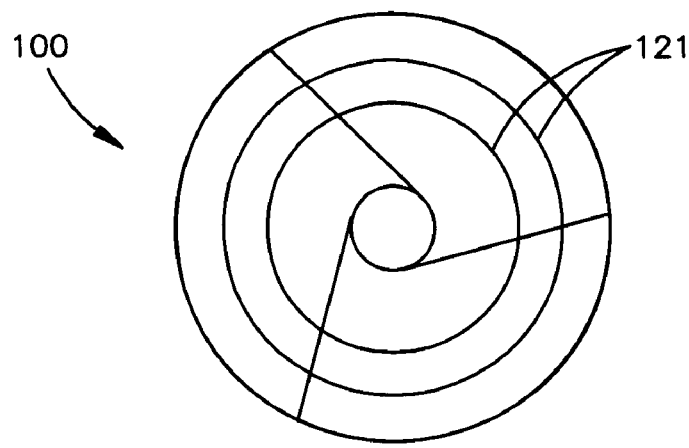
FIG. 8 is a top plan view of a projection in accordance with one embodiment of the invention.

A preferred embodiment of projections 100 also include a plurality of side surfaces 120 which can direct light in a direction different from light being transmitted through flat top surface 110. The direction of light preferably depends on the angle at which side surface 120 meets base 12. As shown in FIG. 8, side surfaces 120 can have a plurality of striations 121 to facilitate dispersing the light. In accordance with a preferred embodiment of projections 100 as illustrated, each projection 100 includes at least 3, preferably 4 side surfaces 120. Preferably, side surfaces 120 are arranged at an acute angle to base 12, more preferably at an angle of less than about 45 degrees. Whereas side surfaces 120 of projections 100 are illustrated as having substantially equal angles with base 12, it is to be understood that various side surfaces 120, for example, side surfaces 120 of different projections 100, can form different angles with base 12 without deviating from the scope of the invention as a matter specific to design choice.

Figure 7:
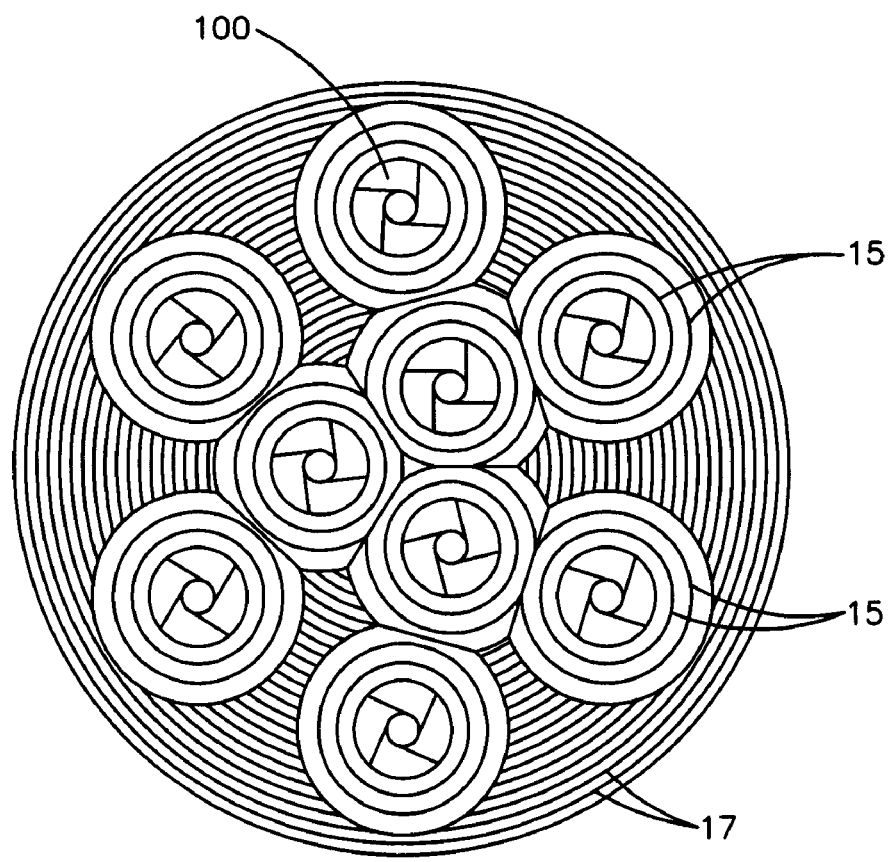
FIG. 7 is a top plan view a lens in accordance with one embodiment of the present invention.

In accordance with a preferred embodiment of the invention, projections 100 are arranged so that side surfaces 120 of different projections 100 direct light in different directions. Preferably, no two side surfaces 120 are parallel, thereby increasing the number of directions in which the light is directed by lens 10. For example, as shown in FIG. 7, an embodiment of lens 10 has nine projections 100 having four side surfaces 120 each. In this embodiment, no two side surface 120 are parallel, thus providing thirty six different directions at which light is transmitted through the collective side surfaces 120.

Figure 5:
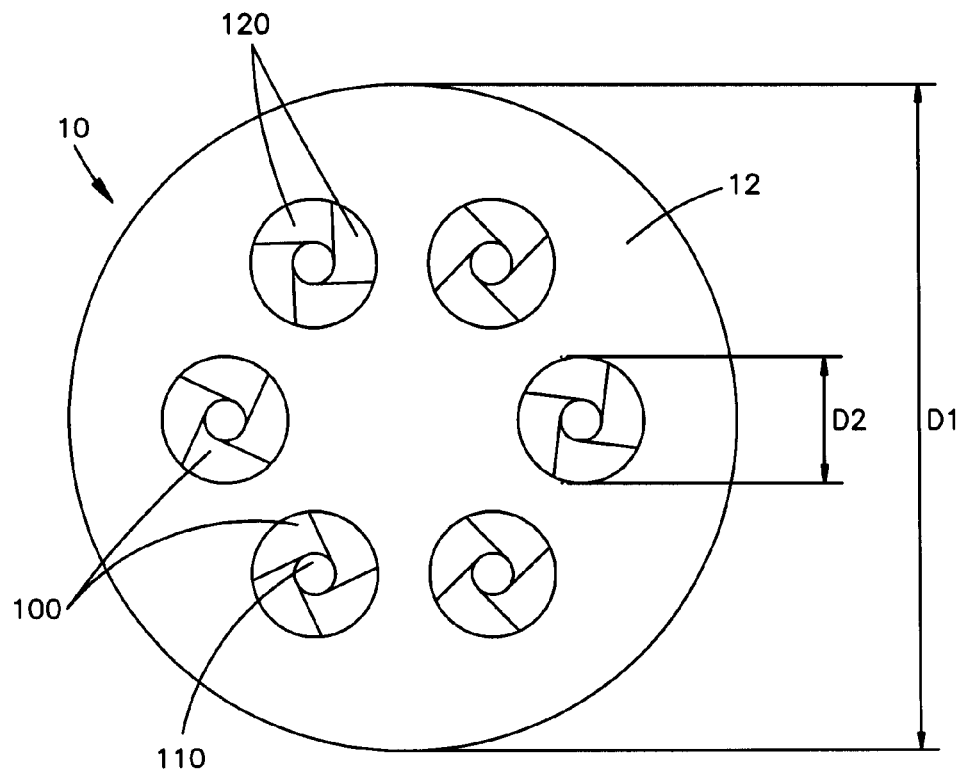
FIG. 5 is a top plan view of the lens of FIG. 3.
Figure 6:
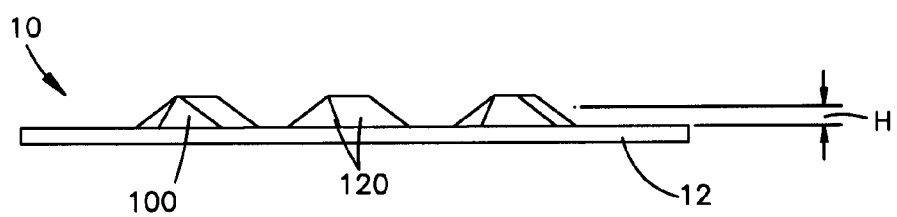
FIG. 6 is a side elevational view of the lens of FIG. 3.

As illustrated in FIGS. 5 and 6, an embodiment of lens 10 comprises a base diameter D1 greater than both projection diameter D2 and projection height H. In accordance with a preferred embodiment of the invention for use with a stop/tail/turn lamp, base diameter D1 is between about 2 to 6 inches, more preferably about 4 inches. Whereas the embodiments of lens 10 shown in FIGS. 1A-7, which are examples of lens 10 for use with stop/tail/turn lamps, include 3, 6 and 9 projections 100, respectively, it is to be understood that the number of projections 100 is not limited and can be as many or few as desired.

Figure 1B:
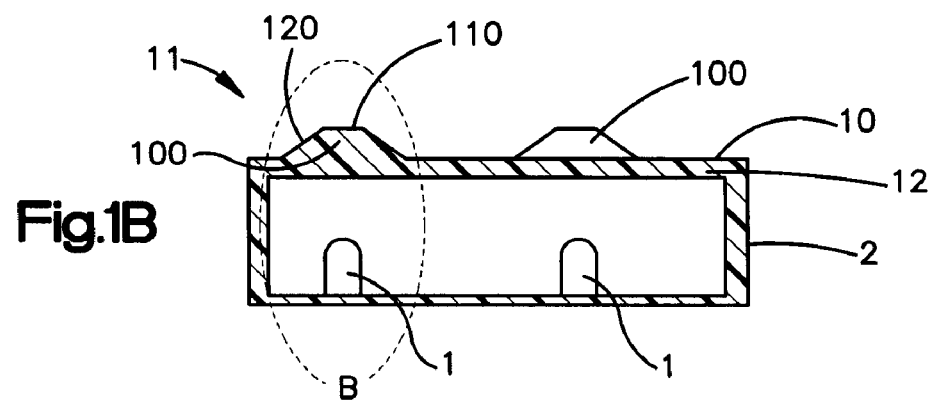
FIG. 1B is a cross-sectional view of the lamp assembly of FIG. 1A taken along section line A-A of FIG. 1A.
Figure 2:
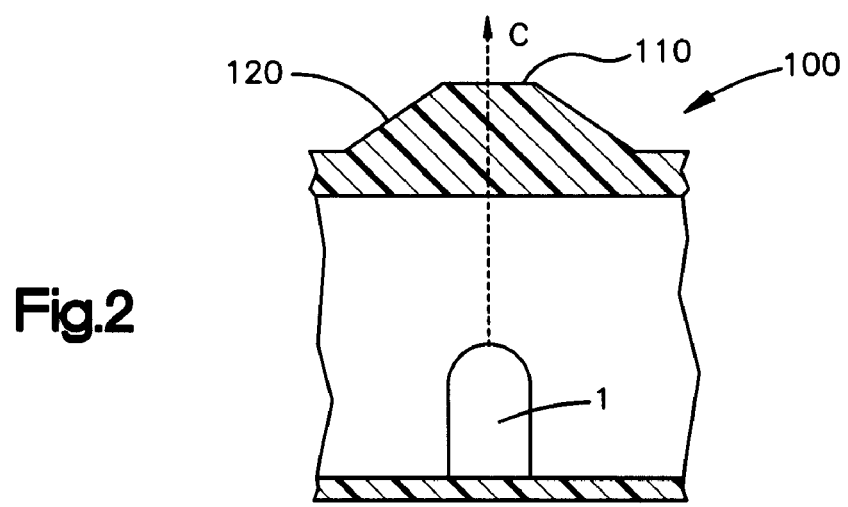
FIG. 2 is a magnified view of a selected portion of the lamp assembly of FIG. 1B.
Figure 3:
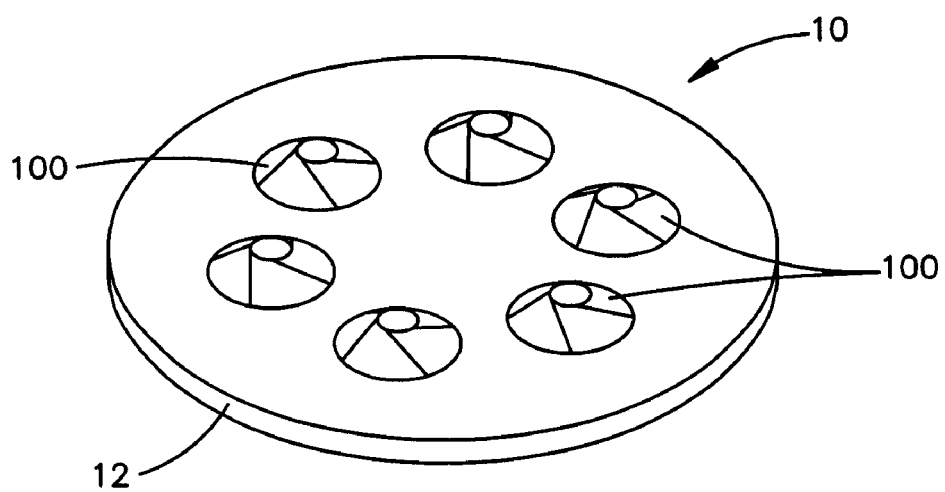
FIG. 3 is a front perspective view of a lens in accordance with one embodiment of the present invention.
Figure 4:
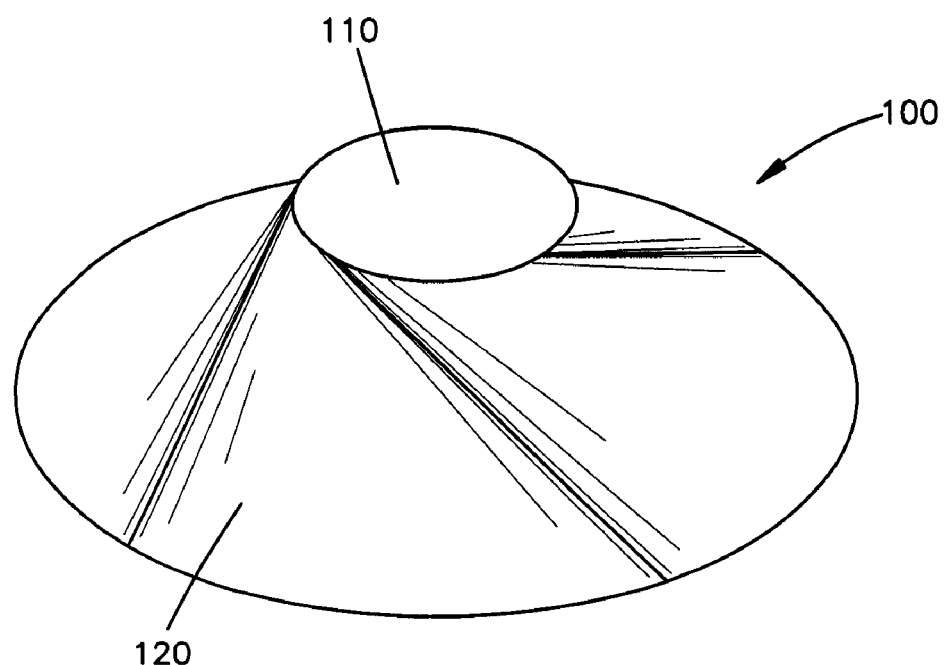
FIG. 4 is a front perspective view of one of the projections of the lens of FIG. 3.

In accordance with an embodiment of the invention, for example, as illustrated in FIGS. 1A-2, lens 10 can be positioned such that base 12 is substantially perpendicular to the LED light source. Therefore, the direction of the light path of the emitted light remains substantially the same at top surface 110. Preferably, the light intensity is magnified through top surface 110. Additionally, the light paths are preferably redirected through side surfaces 120 according to the angle of side surfaces 120 of projections 100. Therefore, the light emitted from the LED(s) can be dispersed to provide a broader area of emitted light, and the light can furthermore be seen from various angles from the LED(s) and lens 10. More preferably, the light passing through side surfaces 120 is further dispersed by striations 121 included in side surfaces 120, thereby further dispersing the emitted light. Therefore, a potential benefit of a lens in accordance with embodiments of the invention shown in FIGS. 1-8 includes, but is not limited to, the production of at least one magnified beam of light perpendicular to the light source as well as dispersed light at various angles from the light source, thus increasing the number of positions with respect to the light source from which the light is visible.

As shown in FIG. 7, base 10 can comprise a plurality of grates 14, preferably arranged as concentric rings. Base 10 can also include a plurality of rings 15 bordering projections 100, preferably a set of rings 15 bordering each projection 100. Grates 14 and rings 15 preferably also disperse the light emitted from the LED's and help produce a glowing effect on the lens. It is to be understood that, however, grates 14 can be arranged in a variety of arrangements, such as parallel lines, curved lines, etc., and similarly, rings 15 can comprise different shapes and arrangements, without deviating from the scope of the invention as a matter of application specific to design choice.

In accordance with a preferred embodiment of the invention as shown in FIG. 7, projections 100, preferably every projection 100 on lens 10, are surrounded by concentric rings 15 suitable for dispersing light. Rings 15 can be formed of grooves, grates, steps, ripples, etc. suitable for enhancing the dispersion of light and creating a glowing effect around projection 100.

Whereas projections 100 are depicted as having a circular base wherein the base diameter is greater than the height of the projections, the dimensions and shape of projections 100 and its base can be varied without deviating from the scope of the invention as matter of application specific to design choice. For example, projections 100 can have a generally pyramidal shape without deviating from the scope of the invention.

Figure 9:
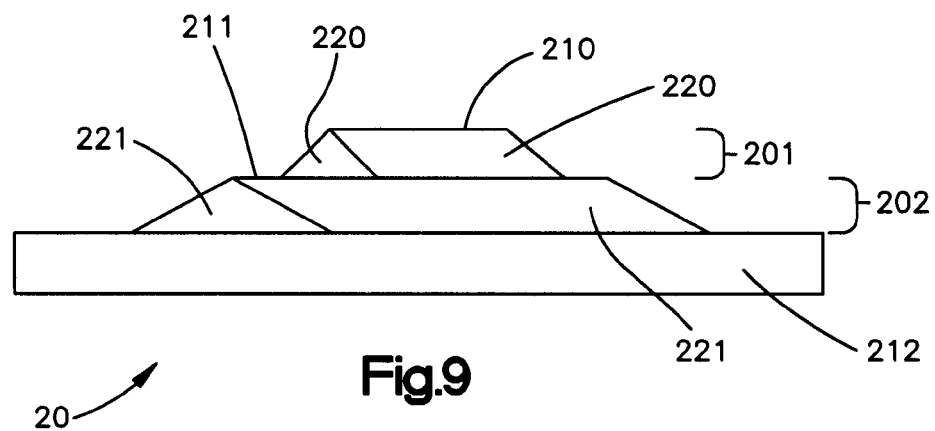
FIG. 9 is a side elevational view of a lens in accordance with one embodiment of the present invention.

Referring to FIG. 9, an embodiment of a lens 20 having a lens base 212 and a projection 200 is shown. In accordance with the embodiment shown, the projection 200 includes an upper portion 201 and a lower portion 201. Upper portion 201 comprises a top flat surface 210 and top side surfaces 220, and lower portion 201 comprises lower side surfaces 221. A substantially flat step 211 is preferably located between top side surface 220 and lower side surface 221.

Top surface 210 of the lens of FIG. 9 is preferably substantially flat, as illustrated, and more preferably is constructed to magnify the light being emitted therethrough. It is also preferable for step 211 to also be constructed to magnify the light being emitted therethrough. In accordance with a preferred embodiment of the invention, both top surface 210 and step 211 do not change the direction of the light, thus providing a plurality of beams of light perpendicular to the light source for each projection 200.

Potential benefits of a stepped projection 200 as illustrated in FIG. 9 include but are not limited to the production of more than one magnified, concentrated, direct beam of light perpendicular to the light source, as well as providing greater dispersion of light. In accordance with one embodiment of the invention, upper side surface 220 and bottom side surface 221 form different angles with base 212, thereby further enhancing the dispersion of light being emitted through lens 20 by providing an additional angle at which the emitted light is dispersed. Furthermore, upper portion 201 can be in a rotated relationship with lower portion 202, thus varying the directions at which light is dispersed.

Figure 10:
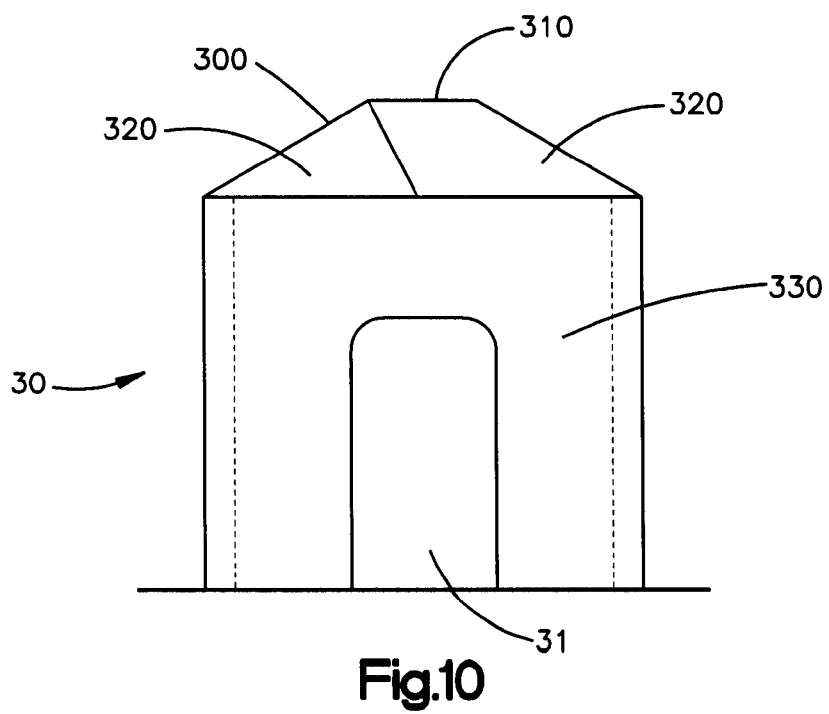
FIG. 10 is a side elevational view of a lens in accordance with one embodiment of the present invention.

In accordance with an embodiment of the invention shown in FIG. 10, lens 30 does not need to be constructed to be placed above a housing containing LEDs. Whereas these constructions are within the scope of the invention, for example, as illustrated in FIGS. 1A-2, it is to be understood that other constructions are also encompassed by the invention, such as lens 30 constructed to be positioned proximate the LEDs, for example, to enclose a single LED 31 as shown in FIG. 10.

Referring to FIG. 10, lens 30 can comprise a base 330 having a generally cylindrical shape suitable for maintaining a projection 300 above LED 31. It is to be understood that base 330 need not be cylindrical, but can take on various shapes and sizes, such as a rectangular shape, and furthermore need not enclose LED 31 and can comprise rods, apertures, etc., without deviating from the scope of the invention. Lens 30 can be used either alone or in combination with a protective member.

Lens 30 can also include projection 300 having a plurality of side surfaces 320 suitable for dispersing light. Projection 300 preferably also includes a substantially flat, top surface 310, which more preferably magnifies the emitted light. It is to be understood that projection 300 is not limited to the embodiment illustrated in FIG. 10 and can comprise different shapes, one or more steps, striations, etc. without deviating from the scope of the invention.

Lens 10, 20, 30 and any components thereof can be made from any material that allows light to pass through it, such as, for example, any translucent or transparent material, including but not limited to glass, acrylic or plastics. In one embodiment of the present invention, lens 10 is produced using a polycarbonate. In another embodiment of the invention, lens 10 can be produced using acrylic.

FIGS. 1A-2 show a lamp assembly in accordance with an embodiment of the invention. More specifically, lamp assembly 11 comprises a housing 2 which can surround one or more LEDs 1, and a lens 10 having base 12 and projections 100. It is preferable for each projection 100 to be at least substantially aligned to one LED 1, as depicted in FIG. 2, which shows a magnified view of area B of FIG. 2B. Such an alignment can be preferred because the light emitted from LED 1 can travel in direction C, at which the emitted light is its strongest, through projection 100, after which the direction remains constant, thus maintaining the maximum intensity of the emitted light.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, projections 100 can comprise a different shape, for example, it can comprise a triangular or rectangular base shape, etc., without deviating from the scope of the invention as a matter of application specific to design choice. Additionally, other alterations can be made, as a way of non-limiting example, varying the number of LEDs, altering the transparency of lens 10 or projections 100, depending on the desired illumination, as a matter of application specific to design choice, without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A lens mountable to a light source having one or more LEDs, the lens comprising a base that is positioned at an angle that is substantially perpendicular to the optical axis of each LED and one or more projections aligned with the optical axis of each LED and facing away from the LED, wherein each projection has a flat top surface that is substantially parallel to the base, and a plurality of sloping side surfaces which are arranged at an angle to the base to form a substantially trapezoidal cross section and can disperse light emitted from the one or more LEDs, to permit the light to be seen at various angles from the light source in addition to being viewed along the optical axis of the LED.

2. The lens of claim 1, wherein the top surface of each projection is a magnifying surface for magnifying light being transmitted therethrough.

3. The lens of claim 1, wherein each projection has more than two adjacent side surfaces, each directing light in a direction distinct from every other adjacent side surface.

4. The lens of claim 1, wherein each projection comprises four adjacent side surfaces.

5. The lens of claim 1, wherein the side surfaces are smooth.

6. The lens of claim 1, wherein the base and the projections form a unitary member.

7. The lens of claim 1, wherein the side surfaces create an angle of about 45 degrees or less with a plane under the projection parallel to the base.

8. The lens of claim 1, wherein the lens is constructed to be mountable on a stop/tail/turn lamp of a vehicle.

9. The lens of claim 1, wherein each projection is suitable for directing light in three or more different directions.

10. The lens of claim 1, wherein each projection is suitable for directing light in thirty-six or more different directions.

11. A lamp comprising one or more LEDs; a housing wherein the one or more LEDs is located; and the lens of claim 1 mounted on the housing.

12. The lens of claim 1, wherein the flat top surface of each projection is located at the center of the projection.

* * * * *